Feb. 23, 1932. M. ROMERA 1,846,459
COMBINATION AGRICULTURAL IMPLEMENT
Filed June 14, 1930  3 Sheets-Sheet 2
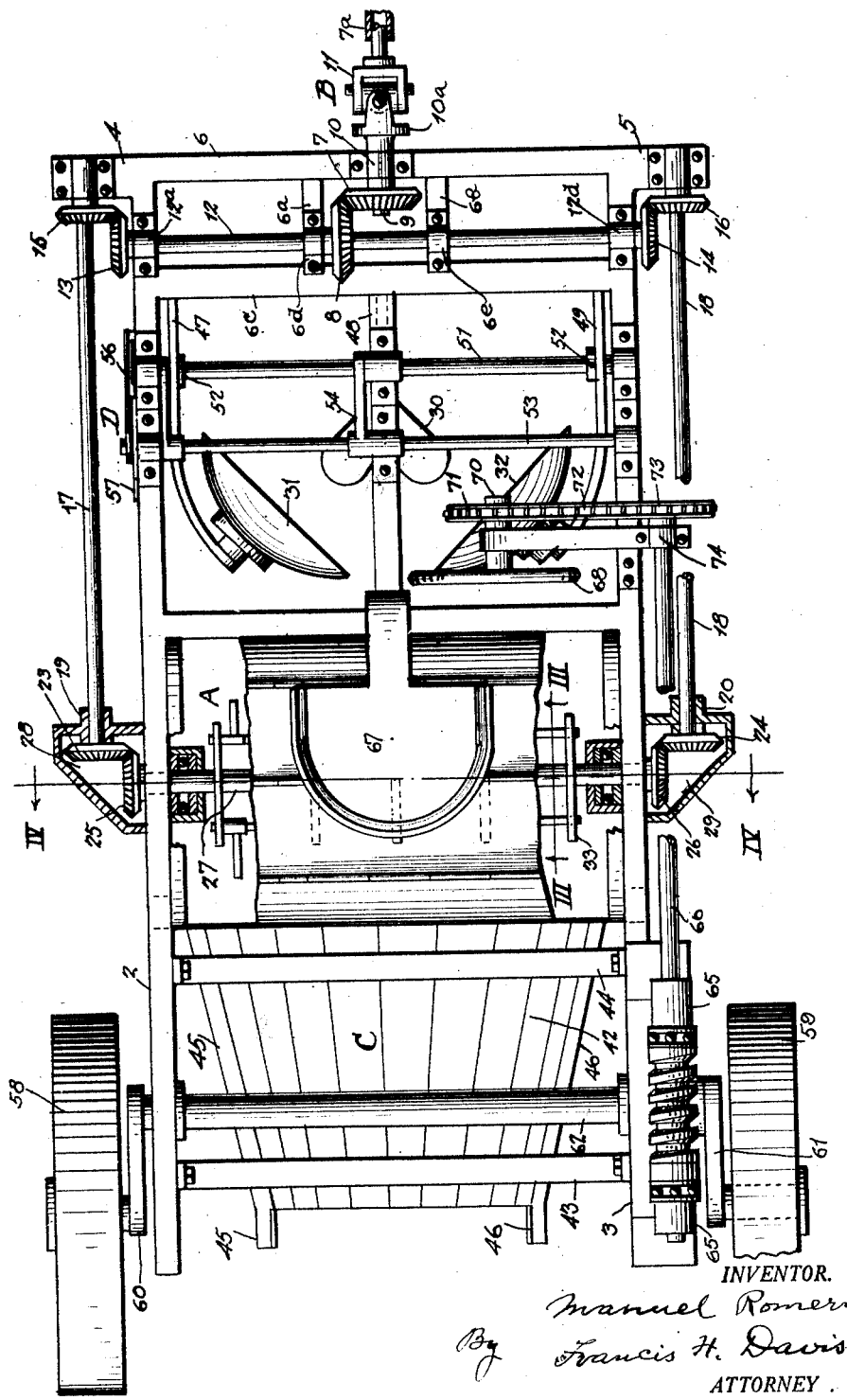
INVENTOR.
Manuel Romera
By Francis H. Davis
ATTORNEY.

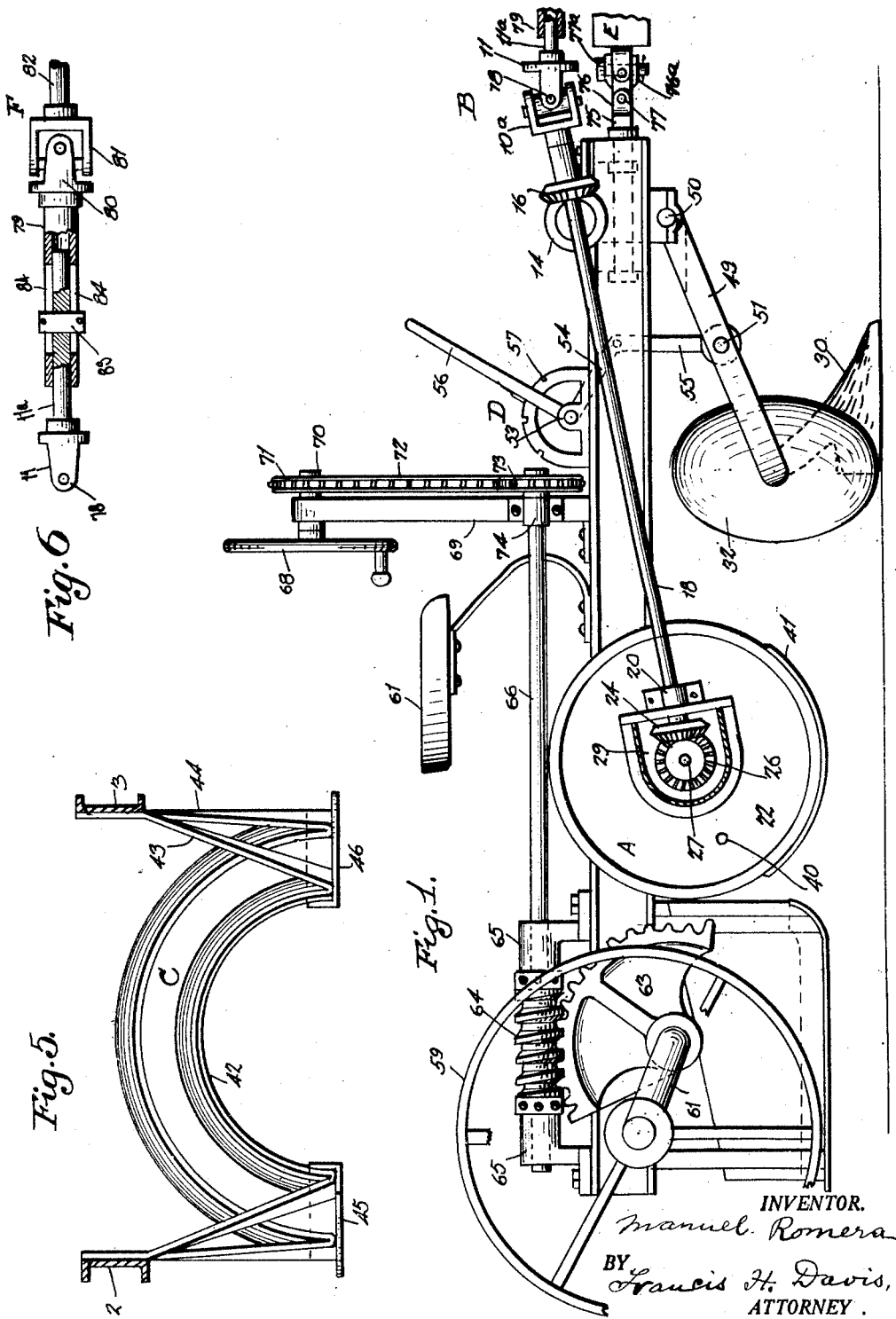

Feb. 23, 1932. M. ROMERA 1,846,459
COMBINATION AGRICULTURAL IMPLEMENT
Filed June 14, 1930 3 Sheets-Sheet 3
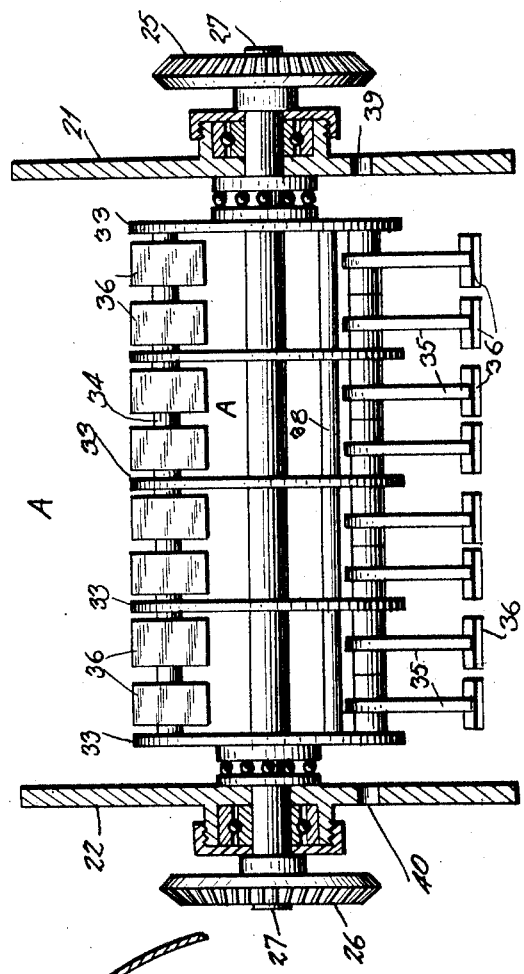
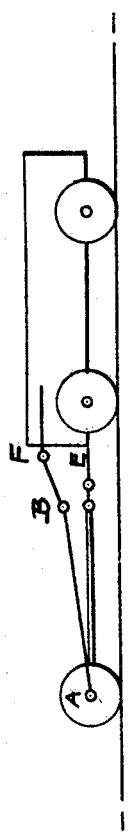
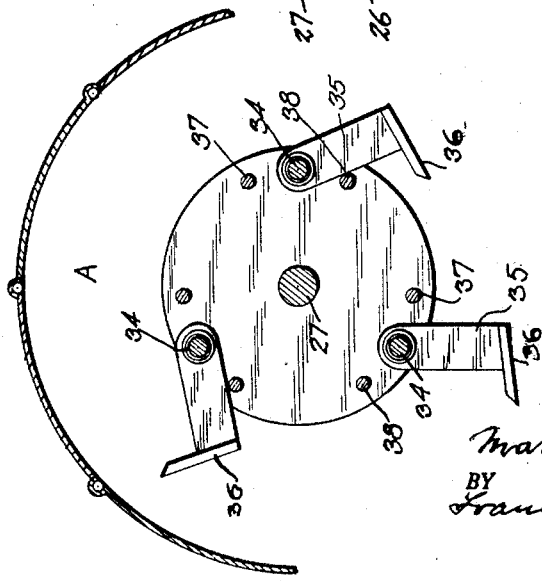
INVENTOR.
Manuel Romera
BY Francis H. Davis.
ATTORNEY.

Patented Feb. 23, 1932

1,846,459

UNITED STATES PATENT OFFICE

MANUEL ROMERA, OF CASTROVILLE, CALIFORNIA, ASSIGNOR OF ONE-THIRD TO EMILIO GUIRIATO AND ONE-THIRD TO ETTORE GUIRIATO, BOTH OF CASTROVILLE, CALIFORNIA

COMBINATION AGRICULTURAL IMPLEMENT

Application filed June 14, 1930. Serial No. 461,176.

This invention relates to agricultural machinery and more particularly to a machine adapted to prepare land in a peculiar and novel manner for the planting of crops.

My present invention is an improvement upon my cofiled invention for an agricultural machine, Serial No. 461,175.

The implement of my present invention comprises a traversable structural frame adapted for regulative adjustment at the rear end thereof with respect to the ground plane; a centrally-disposed double mold-board plow leading ahead of disc plows disposed at each side thereof and adapted to throw the furrow-slices turned by the respective mold-boards back to the center, thus turning the respective slices formed by said mold-boards and said discs inwardly to form a central mounded ridge of thoroughly plowed ground and leave furrows at each side thereof for irrigation to flow.

Following behind said plow and discs, and adapted to operate transversely of said ridge for the full width thereof, is a rotary mill element adapted to run at a relatively high rate of speed, say from 750 to 1000 R. P. M.; said mill being provided with a multiciplicity of beater members having cutting edges and adapted to completely cut up into short pieces all vegetal growths encountered and to reduce the earth matter of said ridge to a powdery condition. Immediately behind said mill is provided a molding means adapted to re-mound said ridge-matter, now reduced to the finest tilth, thereby forming elongated beds adapted for the growth of plants and provided with said irrigation furrows produced by the plow discs.

As a result of thus milling the soil perfect aeration is attained and many injurious insects with their eggs and larvæ are destroyed.

The object of my invention is to provide an agricultural implement designed primarily to plow a strip of land so as to form a ridge of plowed ground having irrigation furrows at each side of it.

Another object is to provide a mill element adapted to chop and pulverize said ridge-matter.

A further object is to provide a drive means for the mill which may be actuated either by an independently carried motor agent, or by an agent carried by the implement itself.

A still further object is to provide a molding member suitably disposed behind the mill to compact the pulverized soil and form it into a longitudinal raised bed as the implement moves forward.

Other important objects are to provide means to regulate the height of the rear end of the structural frame of the implement with relation to the ground plane; and other objects and advantages which will appear, be particularly pointed out in the claims and illustrated in the accompanying drawings, in which:—

Figure 1 is a side elevational view of the implement of my invention.

Figure 2 is a top plan view, partly in section.

Figure 3 is a sectional view of the mill element and cover taken on the line III—III of Figure 2.

Figure 4 is a sectional view of said mill elements taken on the line IV—IV of Figure 2.

Figure 5 is an end view of the molding member.

Figure 6 is a detail view of the telescopic drive member.

Figure 7 is a diagrammatic illustration showing the relative positions of the driving and drawing elements.

Like indicia of reference denote like parts throughout the several views.

In carrying out my invention I provide a longitudinal structural frame, suitably braced, comprising the left side frame member 2 and the right side member 3 disposed parallel to each other and provided with the lateral members 4 and 5 which project from the front ends of said side frame members, for a purpose that will appear.

The transverse frame member 6 connects said side members at the forward end of the machine, the frame members 6a and 6b extend backward to the transverse member 6c and support the bearings 6d and 6e which carry the respective intermeshed mitre-gears 7 and 8.

The shaft 9 of the gear 7 extends forward axially of the machine, is journaled in the bearing 10 and provided on the outer end thereof with the member 10a which forms one member of the universal joint B, the complement 11, being fast to the telescopic rod 11a (see Figure 6) which will be later described. When revolved, the gear 8 rotates the shaft 12 journaled in the respective bearings 12a, 6d, 6e and 12d. It will be noted that the outer respective ends of the shaft 12 are severally provided with the mitre gears 13 and 14 fast thereto and meshed with their complement gears 15 and 16 fast to the respective shafts 17 and 18 journaled in the respective lateral members 4 and 5.

The shafts 17 and 18 extend rearwardly parallel with the axis of the machine and are journaled respectively in the bearings 19 and 20 carried on the outer surfaces of the closure heads 21 and 22, to be described.

The rear ends of said shafts are respectively provided with the bevel or mitre gears 23 and 24 adapted to drive the complement gears 25 and 26 fast to the transverse axis 27 which revolves the rotary cutting mill element A, to be hereinafter described.

It should be noted that the respective gears 23, 25, 24 and 26 being disposed in very dusty positions are housed in the respective chambers 28 and 29 adapted to hold lubricant. Obviously, all the other said gears could be provided with means adapting them to run in lubricant.

Said element A being claimed specifically in my co-pending application of even date herewith, is in the present application described and illustrated in combination with novel dual drive mechanism adapted to apply an even torque to the shaft 27 thus distributing the load more evenly, effecting less wear of the related parts and securing a more balanced rotation for said element. It will be observed that intermediate the element and the front end of the machine there is a novel arrangement of plow elements; comprising the axially-disposed double mold-board plow 30 in advance of two disc plows 31 and 32 respectively disposed one at each side thereof.

The plow 30 opens up the soil throwing one furrow-slice to the right and one to the left. The disc plows are set to throw their furrow-slices inwardly, and in doing so, turn all four furrow-slices together to form a central ridge leaving two open furrows, one in the wake of each disc.

The element A which I will now describe is disposed transversely behind said discs and is adapted to pulverize the matter composing said ridge, and chop up the vegetal growths therein contained.

Said element comprises, the main axis 27 mounted antifrictionally in the respective closure-heads 21 and 22 carried by said structure, the drive gears 25 and 26 fast to the respective ends of said shaft and housed in said oil chambers 28 and 29; the plurality of spacing discs 33 attached to said shaft at suitably disposed intervals, the plurality of pivot shafts 34 adapted to mount the pivotal mill member 35, said members provided on their free ends with the cutting-beating elements 36 adapted for radial play between the respective rest-bars 37 and 38; said pivot shafts and rest-bars being adatped for insertion or removal through the opening means 39 and 40 provided in said heads; said heads being removably mounted in suitably disposed portions of said side frame members provided with openings adapted to accommodate the passage therethrough of said mill element A as a unit. Shoes as 41 are provided to protect the lower edge of said side frame members directly underneath said closure-heads.

The respective means employed, their arrangement and directions of rotation are adapted to drive said element A in a clockwise direction as viewed in Figure 1, thereby bringing the members 35 downwardly on to said ridge matter as the machine travels forward and synchronously discharge said matter violently backward in its pulverized state from the lower, rear portion of said element into the mouth of the mold element C.

*The mold element*

This element shown in Figure 2 and Figure 5, comprises the member 42 which may well be composed of light boiler-plate curved to one half of a truncate cone. Said member is disposed, large end forward, immediately behind the element A and is adapted to receive said pulverized matter as it is flung back by the element A and compact said matter into the form of a longitudinal, raised seed-bed troweled together by the forward travel of the machine.

Said element is attached to the structural side-frames by the straps 43 and 44 or in other suitable manner adapted to hold said mold firmly in position against upward and side pressures.

It should be noted that the bottom edges of said mold are provided with suitable, protective shoe-members as 45 and 46, preferably removable.

The beams 47, 48 and 49 of the respective plow members are rigidly attached at their forward ends to the transverse rock-shaft 50 journaled to the forward portion of the machine; said beams are all disposed in the same plane. The shaft 51 passes through said beams which are suitably spaced apart and secured in place against lateral displacement on said shaft by pins or set-screws 52.

The rockshaft 53 is disposed above the structure at a suitable distance rearward from the shaft 51 and parallel therewith.

The arm 54 fast to the shaft 53 makes linked connection with the rod 55 extending upwardly from the shaft 51 being loose thereon for pivotable movement. Obviously other similar arms and rods could be provided.

The far end of the shaft 53 is provided with the conventional ratchet-and-lever element D disposed within reach of the operator's left hand. Said lever 56 being fast to the shaft 53 is adapted to raise, or lower, all said plows in unison and hold them at suitable levels relative to the ground plane by means carried by said lever and adapted to operate with the notches 57.

The ground-engaging wheels 58 and 59 respectively are mounted on the cranks 60 and 61. Said cranks being turnable with the main axle 62.

It will be noted in Figure 1 that the segmental worm-gear 63 is disposed between the crank 61 and the frame member 3, its hub fast to the axle 62. The worm 64 journaled in the suitable end-bearings 65—65 has its shaft 66 extending parallel with the machine structure to a point forward of the operator's seat 67 so that by leaning forward the operator can manipulate the hand-wheel 68 with the right hand, said wheel being suitably mounted at a convenient level on the stand-bracket 69 attached to the structure.

The axis 70 of said wheel carries the sprocket 71 provided with the chain 72 acting on the sprocket 73 fast to the outer end of the shaft 66 journaled in the adjacent bearing 74 carried by the lower portion of said stand-bracket. Obviously, rotation of said wheel 68 will rotate the worm 64 acting on the segment 63 to cause radial displacement of said cranks thereby raising or lowering the rear end of the machine in relation to the ground plane.

The machine is adapted to be drawn by the bar 75 rockably mounted axially in the structure and held against axial displacement. The forward end of said bar is provided with the jaw member 76 secured to the clevis 76a by the pivot-pin 77 said clevis is removably secured to the element E by the king-bolt 77a. Said arrangement of parts providing coupling means adapted to afford means whereby said agent can make limited right and left turns and draw the machine when said machine and tractor are moving in different surface planes.

It will be noted in Figure 6 that the pivot-pin 78 which unites the members 10a and 11 of the joint B is disposed normally, vertically above the pivot-pin 77, the member 11 carries the shaft 11a projected into the drive-tube 79, provided with the jaw member 80 adapted to unite suitably with the complement member 81 to form the universal joint F, the member 81 adapted to be revolved by the motive agent through the shaft 82.

The shaft 11a is provided with the cotter 83 passing transversely through its central axis and adapted to engage the longitudinal slots 84—84 well shown in said figure, the outer ends of said cotter being pinned to prevent displacement, thus adapting the shaft 82 to drive the shaft 11a and provide for its axial displacement within pre-determined limits as would be the case if said machine and agent were traversing in different planes; the above arrangement of parts comprised in Figure 6 constituting a flexible connection adapting the machine of my invention to be practically operated and drawn by a separate tractive agent which I desire to do as many users already have tractors suitable for the purpose.

From Figure 6 it will be seen that I have made provision to drive the mill A under uneven surface conditions by providing a double linked connection between my machine and a tractor, one being a compensative universal drive, the other a swivelable draft means adapted for limited up and down and relative radial and turnable movements.

It is believed that in the light of the foregoing description that my invention, its purposes, arrangement of the parts and method of operation will be clearly understood.

I desire it to be understood that the said description is illustrative only, and that I reserve the right to make various modifications and changes in the parts and arrangement thereof, so long as they fall within the scope of the appended claims.

I claim:—

1. A machine of the kind described, comprising in combination, a structural frame, rear ground-engaging wheels adapted to travel the machine, means to regulate the height of the machine with respect to the ground plane, means to draw the machine, means to support the front end of the machine when traveled, plow means adapted to raise a ridge, means for up and down regulative adjustment of said plows, mill elements adapted to mill said ridge, means to drive said mill, and means adapted to re-form said ridge.

2. In an agricultural machine as defined in claim 1, said mill elements comprising in combination a transverse rotary unit provided with articulate milling members adapted to mill a ridge, a central axle, dual-drive means adapted to rotate said axle from both ends, and means to drive said dual means.

3. In an agricultural machine as characterized by claim 1, said means to drive the mill element comprising parallel shafts driven by a central shaft, a drive member for said shaft universally connected, said drive member carrying a universal member adapted to connect with a prime driving agent.

4. In an agricultural machine according to claim 1, said means to drive the mill element comprising dual drive means adapted to take power from a single shaft, a universal-drive element interposed between said shaft and a source of power, means adapting said element for compensative axial adjustment.

5. In an agricultural machine adapted to raise an elongated plowed ridge, means to pulverize the ridge and means to re-mold said ridge matter.

6. In an agricultural machine, a structural frame adapted to be traversed, means to raise an elongated plowed ridge, means to mill said ridge, means to re-mold said ridge matter, said means comprising a convex mold tapering backwardly, means securing said mold to said frame adjacent the ground level and the rear of said mill.

7. In an agricultural machine, a structural frame adapted to be traversed, means to raise a plowed elongated ridge, means to mill said ridge, means to re-mold said ridge matter and shoe elements adapted to protect the lower edges of the mold means.

8. In an agricultural machine in accordance with claim 1, a double mold-board plow axially disposed forwardly of the machine structure, plow elements at each side of said double mold-board plow, said elements adapted to turn their furrow slices inwardly, beams to said plows attached to pivotal means adjacent the front of the structure, means connecting said beams and actuating the latter means to elevate and lower said plows in unison.

9. In an agricultural machine as particularized in claim 1, said plow means comprising a double mold-board plow, disc plows at each side thereof, said discs disposed suitably rearward of said mold-board plow and adapted to turn their furrow-slices inwardly, means to draw said plows, means to raise and lower said plows at regulative heights, said regulative means disposed in front of an operator's station.

10. In a machine as defined in claim 1, said means to draw the machine having a pivot adapted to permit vertical movement of a draft member, and having a universally-jointed member whose center is adapted to move in a plane vertical to said pivot.

11. In an agricultural implement as hereinafter specified, plows arranged to throw furrow slices inwardly, means to pulverize the furrow-slices, a backwardly-tapering mold arranged to re-assemble and compact said pulverized matter, the mouth of said mold being wider than the matter.

In testimony whereof I affix my signature this 31st day of May, 1930.

MANUEL ROMERA.